Aug. 13, 1935.   C. A. COMSTOCK   2,011,192
BEARING
Filed Dec. 9, 1932

INVENTOR
CLARENCE A. COMSTOCK
BY
Mitchell Bechert
ATTORNEYS.

Patented Aug. 13, 1935

2,011,192

UNITED STATES PATENT OFFICE 2,011,192

BEARING

Clarence Albert Comstock, New Britain, Conn., assignor to The Fafnir Bearing Company, New Britain, Conn., a corporation of Connecticut Application December 9, 1932, Serial No. 646,360

4 Claims. (Cl. 308—187)

My invention relates to a bearing device and more particularly to a bearing seal or closure.

Various types of bearing seals have heretofore been used. In those situations where the bearings are subjected to substantial shocks such as by reason of quick reversal of directions of movement as in rocker arm constructions on airplane engines and the like, the conventional forms of bearing seals or closures have proven unsatisfactory in that the seals occasionally pop out.

It is the principal object of my invention, therefore, to provide a bearing with an improved, simple seal which cannot become accidentally disengaged from its bearing.

In the drawing which shows, for illustrative purposes only, preferred forms of the invention—

Figure 1:
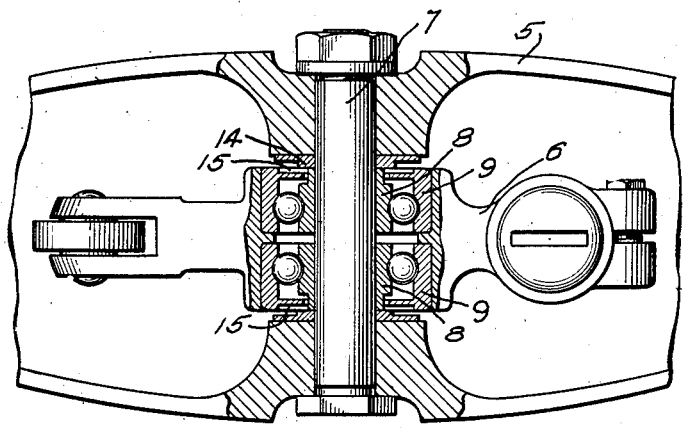
Fig. 1 is a top plan view of a rocker arm construction, the bearing portions being shown in central section.

In the particular embodiment of Fig. 1, 5 indicates a part of the frame, or, in general, a support for the vibrating or oscillating rocker arm 6. The bearing or bearings for the rocker arm may be supported by means of a through bolt 7 upon which are mounted the inner rings 8—8 of the anti-friction bearings. The outer rings 9—9 carry the rocker arm 6.

Each bearing is preferably of the unit handling type when ball bearings are employed. Each ring is provided with a raceway 10 and the balls 11 are positioned in the raceways and serve to hold the two bearing rings in proper position. Ordinarily, one or both of the rings would be provided with filler slots (not shown), the function of which in filling the bearings is well understood.

One of the bearing rings (in the present case the ring 9) is provided with an integral annular inwardly extending seal or closure flange 12 extending toward the inner ring 8 and serving as a closure seal for the space between said rings. The inner ring may be turned down as indicated at 13 to form a recess for the reception of the inner annular edge of the integral closure flange 12 so as to form a relatively tight seal or closure 12 for the bearing. The inner rings, as shown in Fig. 1, may be held in place by abutting against suitable nuts or washers 14—14 which may extend radially outwardly a distance greater than the thickness of the inner ring. The closure flange 12 is cut back or relieved, as indicated at 15, so that there may be perfectly free oscillating motion between the inner and outer rings without interference between the closure flange 12 and the holding device such as the washer 14. It will be apparent that, regardless of the speed of oscillation of the rocker arm 6 and regardless of the shocks to which the bearing may be subjected, there is no possibility of the integral closure flange 12 becoming disengaged from its ring.

Figure 2:
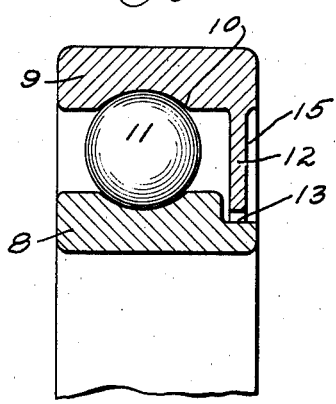
Fig. 2 is an enlarged fragmentary view of a bearing as shown in Fig. 1.
Figure 3:
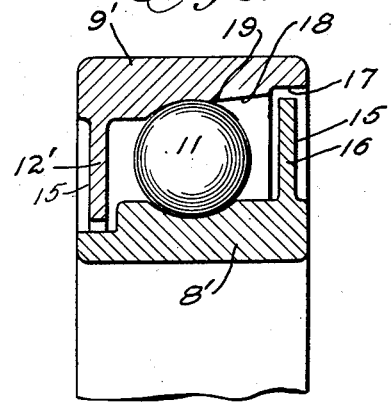
Fig. 3 is a view similar to Fig. 2, but illustrating a modification.

In the form shown in Fig. 3, the outer ring 9' is provided with a flange 12' similar to that heretofore described, which may extend into a turned down portion 13' in all respects similar to the parts shown in Fig. 2. The inner ring 8' at the side opposite the anti-friction bearing members 11 is provided with a radially outwardly extending closure or seal flange 16 which may extend into a counterbored portion 17 in the outer ring. The two flanges 12'—16 therefore serve to completely enclose or seal the bearing. The bearing of Fig. 3, when balls are employed as anti-friction bearing members, will usually be assembled by placing all of the balls in position on the raceway of the inner ring, and the outer ring would be provided with a cut back annularly extending recess 18, the inner end 19 of which terminates short of the bottom of the raceway in the outer ring so that when the rings are forced to position the balls will snap over the shoulder 19 into the raceway and the two bearing rings will thus be held in position so as to form a unit handling bearing.

While the invention has been described in considerable detail and preferred forms shown, it is to be understood that changes and modifications may be made within the scope of the invention as defined in the appended claims.

I claim:

1. In a device of the character indicated, a rocker arm support, a pair of inner bearing rings mounted on said support, a pair of complementary outer bearing rings, said inner and outer bearing rings having raceway grooves therein, anti-friction bearing members interposed between said inner and outer bearing rings and fitting in said grooves, a rocker arm carried by said outer bearing rings, each of said outer bearing rings at the outer side having an integral inwardly extending annular seal flange sealing the space between said inner and outer bearing rings and spaced from and out of contact with said anti-friction bearing members.

2. A unit handling bearing comprising inner and outer bearing rings with complementary groove raceways, anti-friction bearing members on said groove raceways and holding said bearing rings together, one of said bearing rings having an integral annular flange extending toward the other ring and sealing the space between said rings, said flange being positioned at one side of its ring and in spaced apart relation to said groove raceways and said anti-friction bearing members.

3. A bearing comprising inner and outer bearing rings, anti-friction bearing members interposed between said rings, said inner ring having a turned down portion at one end, an integral annular flange on said outer ring and extending into said turned down portion on said inner ring, said flange being relieved at the outer side of the bearing for the purpose described.

4. In a device of the character indicated, a unit handling bearing comprising inner and outer bearing rings with raceways therein for bearing balls, bearing balls in said raceways and serving to hold said rings to each other, one of said rings having an entrance passage to permit said balls to snap into the raceway of one of said rings, each of said rings having an integral annular flange extending toward the other ring and sealing the space between said rings, said flanges on said two rings being positioned at opposite sides of said bearing balls and in spaced apart relation therewith.

CLARENCE ALBERT COMSTOCK.